E. W. LILJEGRAN.
TREE PROTECTOR.
APPLICATION FILED MAY 25, 1912.
1,072,339.
Patented Sept. 2, 1913.
2 SHEETS—SHEET 1.
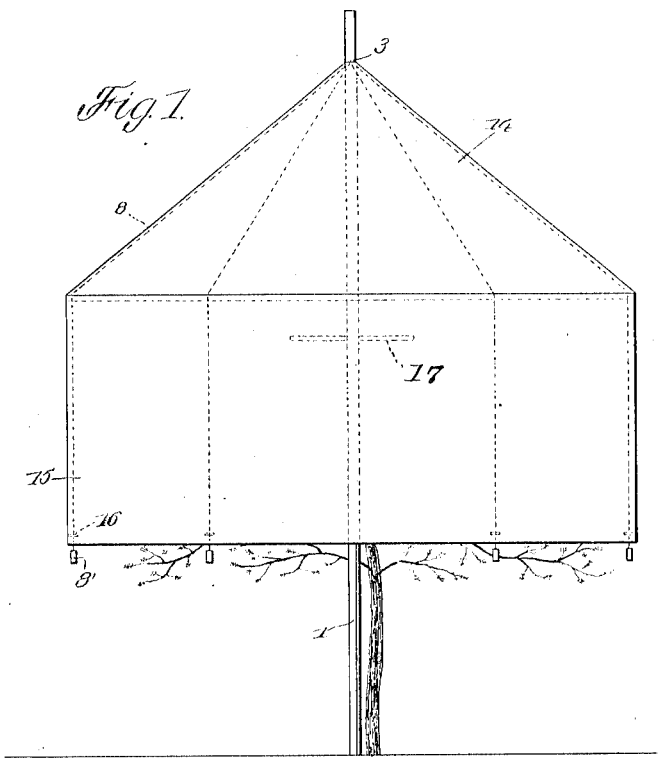
Fig. 1.
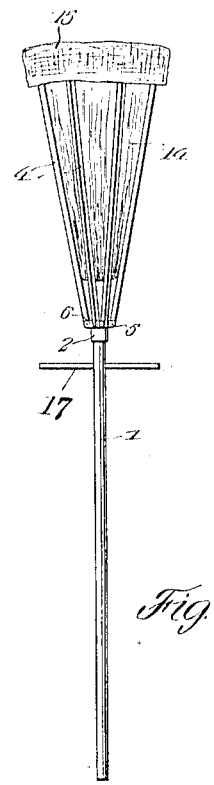
Fig. 4.
Fig. 2.
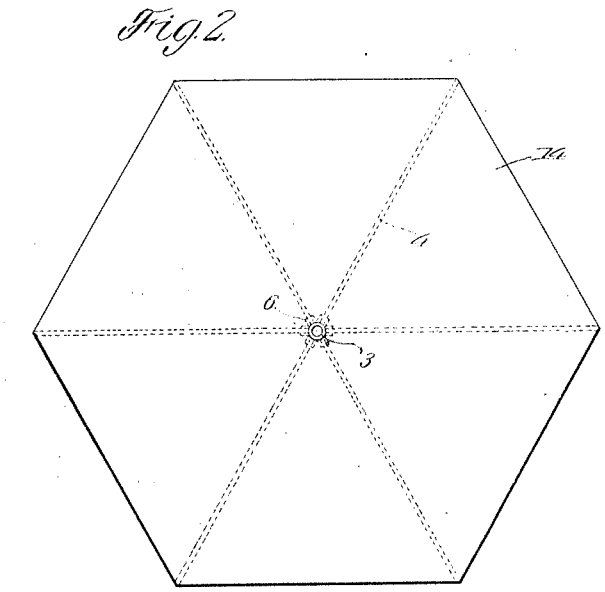
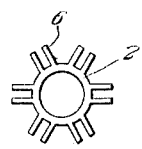
Fig. 7.
Inventor
E. W. Liljegran,
Witnesses
J. H. Crawford.
K. Allen.
By Victor J. Evans
Attorney

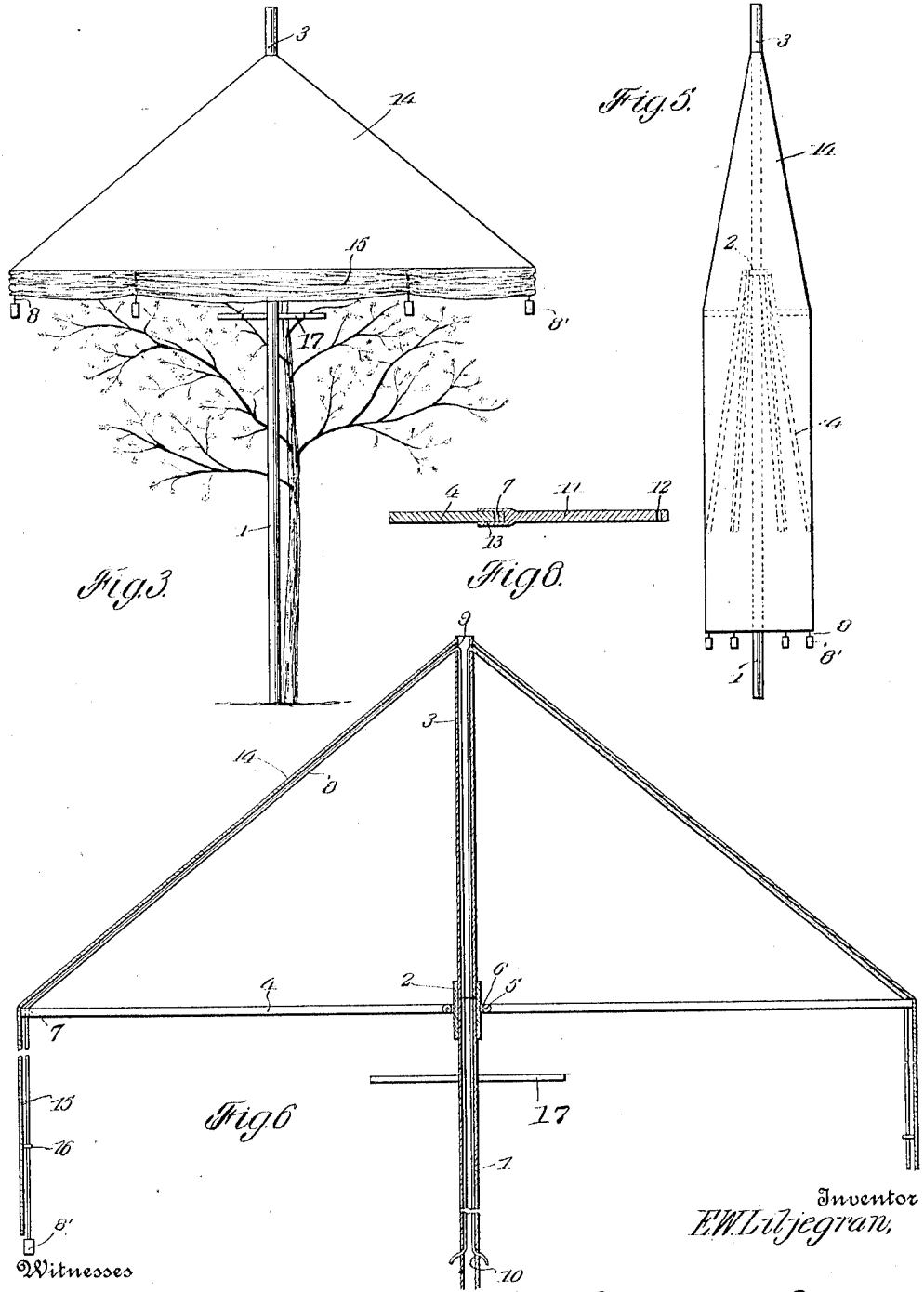

UNITED STATES PATENT OFFICE.

ERNEST W. LILJEGRAN, OF MEDFORD, OREGON.

TREE-PROTECTOR.

1,072,339.

Specification of Letters Patent.

Patented Sept. 2, 1913.

Application filed May 25, 1912. Serial No. 699,815.

*To all whom it may concern:*

Be it known that I, ERNEST W. LILJEGRAN, a citizen of the United States, residing at Medford, in the county of Jackson and State of Oregon, have invented new and useful Improvements in Tree-Protectors, of which the following is a specification.

This invention relates to tree protectors, the object in view being to provide a simple and inexpensive device of the class referred to, which will afford adequate protection against frost, being especially designed for the protection of fruit trees and other plants, the device being further designed to protect trees, plants, and the like from excessive heat, dust, destructive birds, and insects.

A further object of the invention is to provide a construction of tree proctector which will enable the same to be readily collapsed, folded, and adjusted to any one of several positions, in accordance with existing conditions, so that while it serves as a protection for the tree or plant at night time and in bad weather, the device as a whole may be so adjusted as to expose the tree to the action of sunshine at the proper times.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of the protector, shown in its fully applied position to a tree. Fig. 2 is a plan view thereof. Fig. 3 is a side elevation similar to Fig. 1, but showing the curtain drawn upward. Fig. 4 is a side elevation, showing the position assumed by the parts of the protector when the canopy supporting booms are swung upward. Fig. 5 is a similar view, showing the manner in which the device may be folded within the compass of the tree. Fig. 6 is a sectional view of the protector taken diametrically of the mast. Fig. 7 is a detail plan view of the boom frog. Fig. 8 is a detail view of the end portion of one of the booms, showing one of the boom extensions.

In the preferred embodiment of this invention, I employ a central tubular mast 1, at the upper end of which is arranged a tubular boom frog 2 which surrounds the upper end of the mast and is secured thereto in any convenient manner, said boom frog extending above the top of the mast 1, where it is adapted to receive a detachable and tubular mast head 3, which sits down into the upper end of the frog and rests against the upper extremity of the main body of the mast 1. Extending outward radially from the frog 2 is a circular series of booms 4, the inner ends of which are pivotally connected at 5 to ears or lugs 6 arranged in a circular series around the frog 2. Each of the booms 4 is provided at its outer end with a hole or eye 7, through which one of a series of operating cords 8 passes, said cord preferably extending downwardly below the extremity of the boom, where it is provided with a weight 8′ of any suitable description, for producing the requisite tension on the cord to which it is connected, to hold said cord taut, the cord assisting in properly positioning and sustaining the canopy and curtain, hereinafter particularly described. The cord 8 passes from the outer end of the boom upward through an opening 9 in the side of the mast head, and thence downward within the mast to a point where it may be grasped and operated by an attendant standing on the ground.

It will be understood that any desired number of booms 4 may be employed, six being illustrated in the accompanying drawings. It will also be understood that in connection with each boom, a cord 8 is employed, and all of these cords pass through their respective openings in the mast head and downwardly through the mast, and which may be provided at a suitable elevation with an opening 10, through which all of the cords pass, in order to enable them to be fastened to the mast, or to a convenient and adjacent portion of the tree in connection with which the protector is used.

In order to provide for covers and curtains of varying sizes to suit any particular tree to which the protector as a whole is applied, each of the booms may be provided with a boom extension 11 provided at its outer end with an eye 12, corresponding with the eye 7 above referred to to receive one of the operating cords 8. This boom extension is provided at its inner end with a recess 13, adapting it to fit over the outer extremity of the main section 4 of the boom. In the same manner, mast heads 3 of different lengths may be interchangeably connected with the main body of the mast, so as to increase or diminish the height of the protector as a whole.

The cover or canopy 14 which extends above the booms 4 may be made of any suitable fabric, and is preferably of a heavier grade fabric than the curtain 15 which extends from the extremities of the booms 4 downwardly. The curtain 15 is provided at a suitable number of points or intervals with eyes or rings 16, through which the cords 8 pass, so as to enable the weights 8' to maintain the curtain in a stretched condition.

In regions where heavy frost is encountered, it will be necessary for the curtain to be made of sufficient length to reach to the ground, so that all external cold will be excluded and prevented from mixing with the warm radiation from the earth which contains moisture that is converted into frost and mist on the canopy and curtain of the shield, thus increasing the frost resisting properties of the curtain, which accumulation gradually evaporates before the late morning sun, and thus prevents the first rays of the rising sun from striking the plant, with the killing effect, at an enormous cost to the growers.

The mast is adapted to be secured to the tree, according to convenience, but at any point where there is no branch to secure the mast to, a cross head or stay bar 17 may be utilized, one end thereof being fastened to the tree or any branch thereof, in connection with suitable protective padding, such as rags or burlap, the other end of the cross bar being secured to the mast, as indicated in the drawings. Furthermore, if desired, the mast may be made of sufficient length to reach to the ground or be embedded in the ground, thereby forming a lower support for the mast.

During the period of the year when the tree is heavily laden with fruit, the frame will be found to form an admirable support for heavily loaded limbs, and they may be attached by means of ropes or cords to the booms, hereinabove described. This does away with the common practice of using props under the limbs which take up valuable ground space.

When the protector is not in use as such, the curtain may be raised up to the height of the booms, as shown in Fig. 3, or the device may be folded upward above the top of the tree, as shown in Fig. 4, where there is no wind present, and in case of high winds the device as a whole may be folded downward and thrust in among the branches of the tree, as illustrated in Fig. 5.

What is claimed is:

1. A tree protector, comprising a mast, booms pivotally connected with the mast, a cover of fabric supported by the booms and mast and extending below the boom ends forming a pendant curtain, eyes on said curtain, and operating cords connected with the bottom edge of the curtain passing through the eyes of the curtain and also through eyes in the booms to the mast head and downwardly lengthwise of the mast.

2. A tree protector, comprising a central tubular mast, booms pivotally connected with the mast, a cover of fabric supported by the booms and mast, operating cords passing from the outer extremities of the booms upward to the mast head and thence downward within the mast, said cords extending downward below the booms, and being slidable through eyes at the ends of the booms and weights attached to the cords below the booms.

3. A tree protector, comprising a central tubular mast, a detachable mast head forming an extension of the mast, booms pivotally connected with the mast, a cover of fabric supported by the booms and mast, operating cords slidable through eyes in the outer extremities of the booms and extending upward to the mast head and thence downward within the mast and weights at the outer extremities of the cords.

4. A tree protector, comprising a tubular mast, booms pivotally connected with the mast, a cover of fabric supported by the booms and mast and extending below the boom ends forming a pendant curtain, eyes on said curtain, and operating cords connected with the bottom edge of the curtain and passing through the eyes of the curtain and also through eyes in the booms to the mast head and downward within the mast.

In testimony whereof I affix my signature in presence of two witnesses.

ERNEST W. LILJEGRAN.

Witnesses:
C. R. RAY,
JOHN W. OPP.

---

Copies of this patent may be obtained for five cents each, by addressing the "Commissioner of Patents, Washington, D. C."